US012647884B2

(12) United States Patent
Sinicco et al.

(10) Patent No.: US 12,647,884 B2
(45) Date of Patent: Jun. 2, 2026

(54) SYSTEMS AND METHODS FOR PROVIDING VOLTAGE BOOSTING TO A TIME DOMAIN DUPLEXING RADIO

(71) Applicant: Outdoor Wireless Networks LLC, Claremont, NC (US)

(72) Inventors: Alessandro Sinicco, Monza (IT); Sammit Patel, Dallas, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/874,029

(22) PCT Filed: Jun. 8, 2023

(86) PCT No.: PCT/US2023/024865
§ 371 (c)(1),
(2) Date: Dec. 11, 2024

(87) PCT Pub. No.: WO2024/006047
PCT Pub. Date: Jan. 4, 2024

(65) Prior Publication Data
US 2026/0006546 A1 Jan. 1, 2026

(30) Foreign Application Priority Data

Jul. 1, 2022 (IT) ........................ 102022000013918

(51) Int. Cl.
*H02M 3/18* (2006.01)
*G05F 1/62* (2006.01)
(Continued)

(52) U.S. Cl.
CPC .......... *H04W 52/0206* (2013.01); *G05F 1/62* (2013.01); *H04M 19/008* (2013.01); *H04M 19/08* (2013.01)

(58) Field of Classification Search
None
See application file for complete search history.

(56) References Cited

U.S. PATENT DOCUMENTS 9,448,576 B2 9/2016 Chamberlain et al.
2018/0337705 A1 11/2018 Coleman et al.

FOREIGN PATENT DOCUMENTS

EP 2677816 A1 12/2013
WO WO-2013064345 A2 * 5/2013 ............. H05B 45/46
WO 2024006047 A1 1/2024

OTHER PUBLICATIONS

Theiler, Controlled Supply Circuit , May 10, 2013 (Year: 2013).*
(Continued)

*Primary Examiner* — Gary Lafontant
(74) *Attorney, Agent, or Firm* — Fogg & Powers LLC

(57) ABSTRACT

Techniques are provided for diminishing power loss in electrical conductors used to provide electrical power to a radio configured to use time domain duplexing (TDD). Because the TDD radio typically transmits data during a downlink subframe, the TDD radio generally consumes more power, and thus draws more current through the electrical conductors, then during an uplink subframe when the TDD radio is configured to receive. Thus, during the downlink subframe, a DC voltage, output by a DC-DC voltage converter to the electrical conductors, is increased to lessen current drawn by the radio through the electrical conductors. As a result, power loss in the electrical conductors is reduced.

19 Claims, 7 Drawing Sheets

(51) Int. Cl.
    *H04M 19/00*      (2006.01)
    *H04M 19/08*      (2006.01)
    *H04W 52/02*      (2009.01)

(56)               References Cited

OTHER PUBLICATIONS

International Searching Authority, "International Search Report and Written Opinion", dated Sep. 8, 2023, from PCT Application No. PCT/US2023/024865, pp. 1 through 10, Published: WO.
Italian Patent Office, "Search Report", dated Feb. 8, 2023, from IT Application No. 102022000013918, pp. 1 through 8, Published: IT.

* cited by examiner

440

440A — Synchronize Time

440B — Receive TDD Configuration or Indication of TDD Configuration, and Reference Time 440C — Determine Start and End Times of Each DL Subframe 440D — Increase DC-DC Voltage Converter Output Voltage 440E — Decrease The DC-DC Voltage Converter Output Voltage

SYSTEMS AND METHODS FOR PROVIDING VOLTAGE BOOSTING TO A TIME DOMAIN DUPLEXING RADIO

CROSS-REFERENCE TO RELATED APPLICATIONS

The present application claims priority to Italian Patent Application Serial No. 102022000013918, filed Jul. 1, 2022; the entire contents of the aforementioned patent application is incorporated herein by reference as if set forth in its entirety.

BACKGROUND

A power supply is used to provide direct current (DC) power to a DC input of a radio of a cellular communications system through electrical conductors. When the radio is transmitting, current drawn through the electrical conductors is significantly increased. Power dissipation in the electrical conductors dramatically increases during radio transmission because power dissipation is a function of a square of current flow. Techniques for diminishing power dissipation are disclosed in U.S. Pat. No. 9,448,576 ("the '576 patent") which is incorporated by reference herein in its entirety.

The techniques disclosed in the '576 patent utilize a voltage booster which boosts, based upon certain information, a voltage at an output of the voltage booster and an electrical power input of the radio. When voltage provided to the electrical power input of the radio is increased, the current drawn by the electrical power input of the radio is decreased. As a result, power dissipation in the electrical conductors is diminished. The information used by the techniques of the '576 patent are measurements of the current and information about a resistance of the electrical conductors, or measurements of a parameter, e.g., a voltage, at ends of the electrical conductors near the electrical power input of the radio. However, such information may not be obtained cost effectively and/or easily.

SUMMARY

A method for diminishing power dissipation in electrical conductors providing direct current (DC) electrical power to a time division duplexing (TDD) radio is provided. The method comprises: synchronizing timing of a DC-DC voltage converter with a time source external to the DC-DC voltage converter; receiving, from a component of a radio access network (RAN) external to the DC-DC voltage converter, (a) a TDD frame configuration or an indication of the TDD frame configuration and (b) a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the start time of each downlink subframe in the TDD frame, during each downlink subframe, of the TDD frame, increasing a DC voltage output by the DC-DC voltage converter; and using the end time of each downlink subframe in the TDD frame, on or after cessation of each downlink subframe in the TDD frame, decreasing the DC voltage output by the DC-DC voltage converter.

A non-transitory computer readable medium storing a program causing at least one processor to execute a process for diminishing power dissipation in electrical conductors providing direct current (DC) electrical power to a time division duplexing (TDD) radio is provided. The process comprises: synchronizing timing of a DC-DC voltage converter with a time source external to the DC-DC voltage converter; receiving, from a component of a radio access network (RAN) external to the DC-DC voltage converter, (a) a TDD frame configuration or an indication of the TDD frame configuration and (b) a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the start time of each downlink subframe in the TDD frame, during each downlink subframe, of the TDD frame, of the TDD radio, causing an increase of a DC voltage output by the DC-DC voltage converter; and using the end time of each downlink subframe in the TDD frame, on or after cessation of each downlink subframe in the TDD frame, causing a decrease of the DC voltage output by the DC-DC voltage converter.

An apparatus for diminishing power dissipation in electrical conductors providing direct current (DC) electrical power to a time division duplexing (TDD) radio is provided. The apparatus comprises: DC-DC voltage converter circuitry comprising an output and configured to be electrically coupled, through the electrical conductors, to a DC power input of the TDD radio; current measurement circuitry coupled to the output and configured to measure direct current drawn from the output of the DC-DC voltage converter circuitry; and processing circuitry communicatively coupled to the DC-DC voltage converter circuitry, configured to be communicatively coupled to a time source external to the apparatus, and configured to: receive a direct current measured at the output of the DC-DC voltage converter circuitry; using the direct current, identify a TDD frame configuration of the TDD radio and determining a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using at least one of the TDD frame configuration and the reference time, determine a start time and an end time of each downlink subframe in a TDD frame; using the start time of each downlink subframe in the TDD frame, during each downlink subframe, of the TDD frame, of the TDD radio, cause an increase of a DC voltage output by the DC-DC voltage converter circuitry; and using the end time of each downlink subframe in the TDD frame, on or after cessation of each downlink subframe in the TDD frame, cause a decrease of the DC voltage output by the DC-DC voltage converter circuitry.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
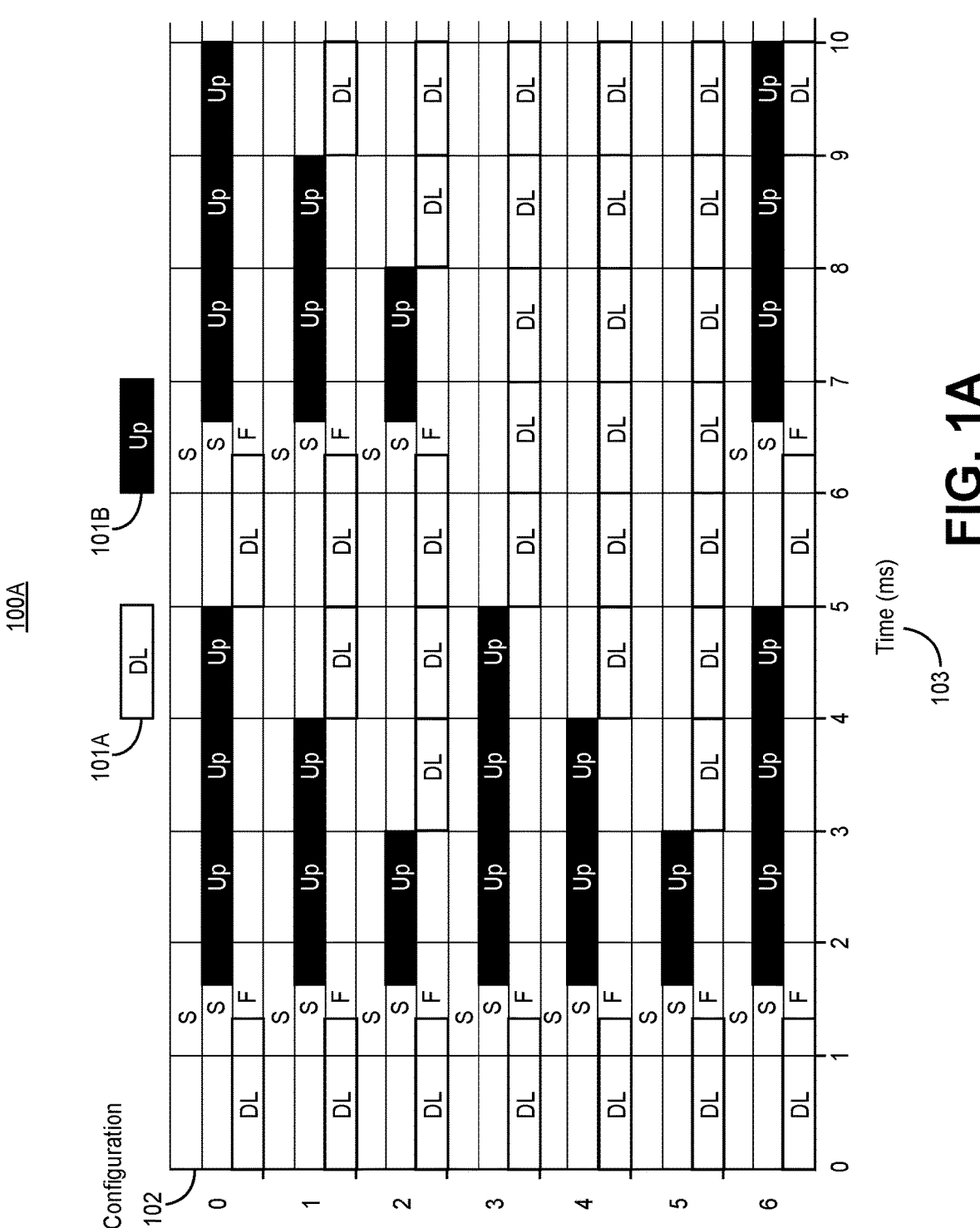
FIG. 1A illustrates a diagram of one embodiment of exemplary TDD frame configurations during one TDD frame.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

Embodiments of the invention diminish power loss in the electrical conductors used to provide electrical power to a radio configured to use time domain duplexing (TDD). Embodiments of the invention do not require measurements of the current and information about a resistance of the electrical conductors, or measurements of a parameter at ends of the electrical conductors near the electrical power input of the radio.

TDD is utilized by radios in communications systems (e.g., cellular communications systems, fixed wireless access communications systems, and cellular backhaul communications systems). A radio configured to employ TDD is referred to herein as a TDD radio.

TDD radios transmit and receive during TDD frames. Each TDD frame comprises at least one downlink subframe and at least one uplink subframe. A downlink subframe is a period in time when data can be transmitted from a TDD radio to another TDD radio, e.g., user equipment. An uplink subframe is a period of time when data can be received by the TDD radio from the other TDD radio, e.g., the user equipment. Because the TDD radio typically transmits data during a downlink subframe, the TDD radio generally consumes more power, and thus draws more current through the electrical conductors, then during an uplink subframe when the TDD radio is configured to receive.

Each downlink subframe and each uplink subframe has a fixed time length, e.g., that is of one or more fixed time lengths. Each TDD frame has a time period comprising a sum of the time periods of each of the uplink and downlink subframes which form the TDD frame. Optionally, the TDD frame comprises ten subframes each of which has a time period of one millisecond; thus, the TDD frame has a time period of ten milliseconds.

A manufacturer of the radio specifies a DC input voltage operating range between a minimum DC voltage and a maximum DC voltage. The manufacturer represents that a radio will function properly if a DC voltage, within the DC input voltage operating range, is provided to the DC power input of the radio. If the DC voltage, provided to the DC power input of the radio, falls outside of the DC input voltage operating range, then the radio may not function properly, and may even be damaged. The manufacturer also specifies a nominal DC voltage, within the DC input voltage operating range, to be provided to the DC power input of the radio; the nominal DC voltage is a DC voltage which the manufacturer suggests be provided to the DC power input of the radio.

During a TDD downlink subframe, a voltage at an output of a DC-DC voltage converter is increased, e.g., to a voltage larger than the nominal DC voltage and less than the maximum DC voltage. At other times, e.g., during a TDD uplink subframe, the voltage at the output of the DC-DC voltage is decreased, e.g., to the nominal DC voltage. The voltage range and voltage described above are provided for pedagogical purposes; other voltage ranges and voltages may be used in lieu of those described above.

Optionally, the radio and/or a scheduler are configured to provide (a) a TDD frame configuration type and/or data describing the TDD frame configuration type, and/or (b) a reference time. A component of a radio access network (RAN), for example a baseband unit, e.g., a virtual baseband unit, comprises the scheduler. If used, the scheduler stores a TDD frame configuration utilized by the radio. Based upon the TDD frame configuration, the scheduler ensures that time and frequency blocks (a) in a downlink subframe are allocated to a receiving user equipment communicatively coupled to a TDD radio, and (b) in an uplink subframe are allocated to a transmitting user equipment communicatively coupled to the TDD radio.

Optionally, there are two or more, e.g., seven, TDD frame configurations which may be used by the radio. TDD frame configuration of a radio may change over time. Each TDD frame configuration specifies a TDD frame, i.e., specifies a unique sequence of downlink subframes and uplink subframes and optionally the time duration of each of such subframes comprising the sequence; if the time duration of each subframe is not specified then it is otherwise known. Optionally, some TDD frames have more downlink subframes than uplink subframes or vice versa.

FIG. 1A illustrates a diagram of one embodiment of exemplary TDD frame configurations during one TDD frame 100A. FIG. 1A illustrates seven TDD frame configurations 102. Each TDD frame configuration includes downlink subframes 101A and uplink (UL or Up) subframes 101B over time 103.

The reference time means a time when a TDD frame commences in the past, present, or future, or from which such time can be derived. Optionally, the period of each TDD frame comprising a TDD frame configuration is known and/or is equal. Optionally, the time period of each subframe, comprising a TDD frame of each TDD frame configuration, is known. Thus, with knowledge of the reference time and knowledge of a time period of each TDD frame, a start time of each frame can be determined, e.g., by the DC-DC voltage converter. As a result, during each downlink subframe, the DC-DC voltage converter provides a larger, e.g., increases, a DC voltage at an output of the DC-DC voltage converter. During other times, e.g., during each uplink subframe, the DC-DC voltage converter provides a smaller, e.g., decreases, the DC voltage at the output of the DC-DC voltage converter.

For pedagogical purposes, a radio access network illustrated herein is a 5G radio access network configured to satisfy the open radio access network (O-RAN) Alliance specifications ("O-RAN specifications"). However, embodiments of the invention may be used to implement other types of radio access networks (e.g., other types of cellular systems or fixed wireless access systems). Thus, embodiments of the invention are not limited to RAN implementations compliant with O-RAN specifications.

Thus, for pedagogical purposes, the radio illustrated herein is an O-RAN compliant radio unit (O-RAN radio unit or O-RU) and the baseband unit illustrated herein is virtual baseband unit, e.g., comprising an O-RAN compliant distributed unit (O-DU) and an O-RAN compliant central unit (O-RAN central unit or O-CU). However, in other embodiments of the invention, the radio and/or the baseband unit can be compliant with other standards, and thus may not be an O-RU, an O-DU, and/or an O-CU. Also, a physical baseband unit can be used in lieu of a virtual baseband unit. Thus, embodiments of the invention described herein may be implemented with a radio and a baseband unit even though the terms O-RU and virtual baseband unit (or O-DU and O-CU) are used.

The O-RAN specifications include without limitation the O-RAN fronthaul working group control, user and synchronization plane specification (ORAN-WG4. CUS.0-V04.00) and O-RAN Alliance working group 4 management plane specification (ORAN-WG4. MP.0-v04.00.00); these O-RAN specifications are hereby incorporated by reference herein in their entirety. The O-RAN specifications permit interoperability of RAN components, e.g., an O-RU, an O-DU, and an O-CU, made by different vendors. An O-RU is a specific type of radio illustrated herein for pedagogical purposes. The O-RU converts received wireless signals into data which can be sent over a packet network to the O-DU, and converts data received from the O-DU over a packet network to a signal that is wirelessly broadcast.

Optionally, the virtual baseband unit comprises an O-DU and an O-CU. The O-DU and O-CU perform functions of a baseband unit (BBU) and each may be executed on a same or different server system, e.g., local server network(s) and/or cloud computing system(s). Optionally, the O-DU is executed on a server system co-located with the O-RU, e.g., at the site of the O-RU, and the O-CU is executed on a cloud computing system remotely located, e.g., distant, from the site of the O-RU. Pursuant to the O-RAN specifications, O-RAN components utilize message protocols to communicate amongst themselves.

A virtual baseband unit means a baseband unit configured to be executed on server(s) and/or in a cloud computing system, and to be communicatively coupled to at least one radio. A virtual baseband unit processes, e.g., encodes baseband data received from a radio and decodes data sent to the radio. The virtual baseband unit and radio(s) are components of a radio system. For purposes of clarity, the embodiments of the invention are illustrated as being implemented with a virtual baseband, e.g., using an O-DU and a O-CU; however, embodiments of the invention may be implemented with any type of baseband unit.

A virtual baseband unit performs some or all of the functions described above and attributed to the O-DU and O-CU. The virtual base band is communicatively coupled, e.g., through the O-CU, to a core network. The virtual baseband unit and radio(s) are components of a communications system such as a cellular communications system and/or a fixed wireless access communications system that provides point to point communications. Thus, the RAN provides a wireless communications link between the core network and other radio(s), e.g., user equipment.

Communications between RAN components, e.g., a virtual baseband unit or the O-RU, and another RAN component (e.g., the DC-DC voltage converter) are facilitated using an input/output (I/O) data protocol. The I/O data protocol is a protocol used to convey messages, e.g., in a user plane, a control plane, a synchronization plane, and/or a management plane; however, one or more alternative planes may be used in lieu of the foregoing. IEEE1914.3 compliant communications protocol, Common Public Radio Interface (CPRI), and Enhanced CPRI (eCPRI) are examples of I/O data protocols; however, other I/O data protocols may be used. Optionally, communications between a virtual baseband unit comprising the scheduler and a DC-DC voltage converter are facilitated using an input/output (I/O) data protocol used by the virtual baseband unit and the DC-DC voltage converter.

Each message protocol has a format, i.e., a syntax with one or more variables. Data about TDD frame configuration (e.g., TDD frame configuration type, and/or TDD frame time length and/or a number and relative location (with respect to time) of downlink and uplink subframes in the TDD frame configuration type) and a reference time may be obtained by the DC-DC voltage converter from the radio and/or the scheduler in message(s) provided from the radio and/or the virtual baseband unit (e.g., from the O-DU or the O-CU) after the DC-DC voltage converter sends the radio and/or the virtual baseband unit message(s) requesting such information. Alternatively, the radio and/or the scheduler may send, e.g., periodically, such data about the TDD frame configuration and the reference time to the DC-DC voltage converter without receiving message(s) from the DC-DC voltage converter requesting such data.

Figure 1B:
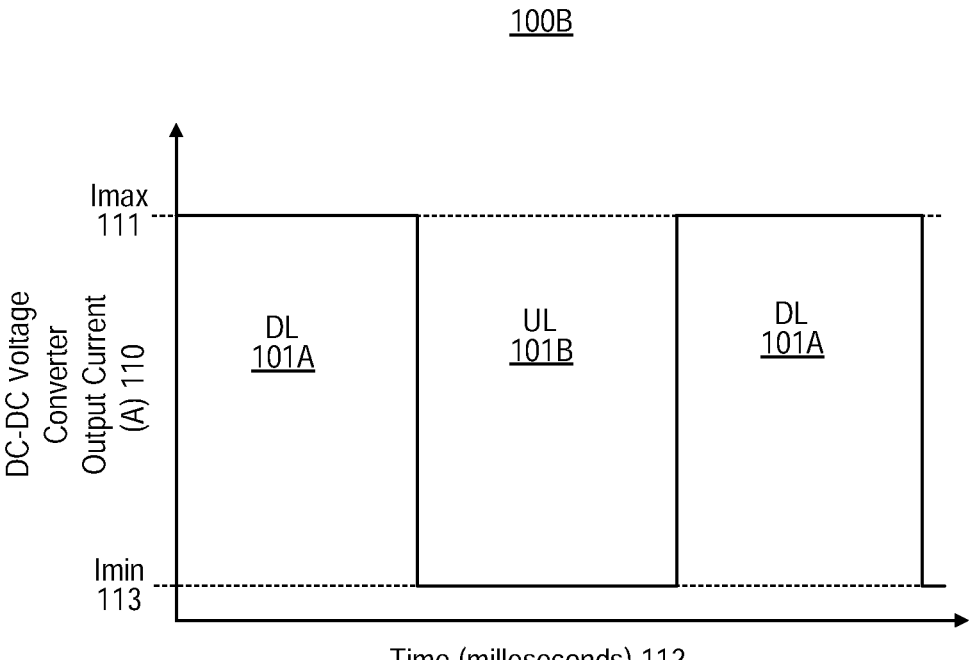
FIG. 1B illustrates a diagram of one embodiment of a DC-DC voltage converter output current versus time during downlink and uplink subframes.

FIG. 1B illustrates a diagram of one embodiment of a DC-DC voltage converter output current 110 versus time 112 during downlink and uplink subframes 100B. During a downlink subframe, a TDD radio will typically consume significantly higher DC power than during a time outside of the downlink subframe, e.g., during an uplink subframe or special subframe (described elsewhere herein). TDD radio DC power consumption is increased during a downlink subframe 101A due to power consumption of TDD radio's power amplifier(s) used to increase the power level of downlink signals transmitted by the TDD radio and emitted by antenna(s) coupled thereto. Thus, the TDD radio draws higher DC current, e.g., Imax 111, from an output of the DC-DC voltage converter during the downlink subframe 101A than during the time outside of the downlink subframe 101A, e.g., during an uplink subframe 101B. During uplink subframes 101B, the TDD radio draws less DC current, e.g., Imin 113 from the output the DC-DC voltage converter than during a downlink subframe 101A.

Figure 2A:
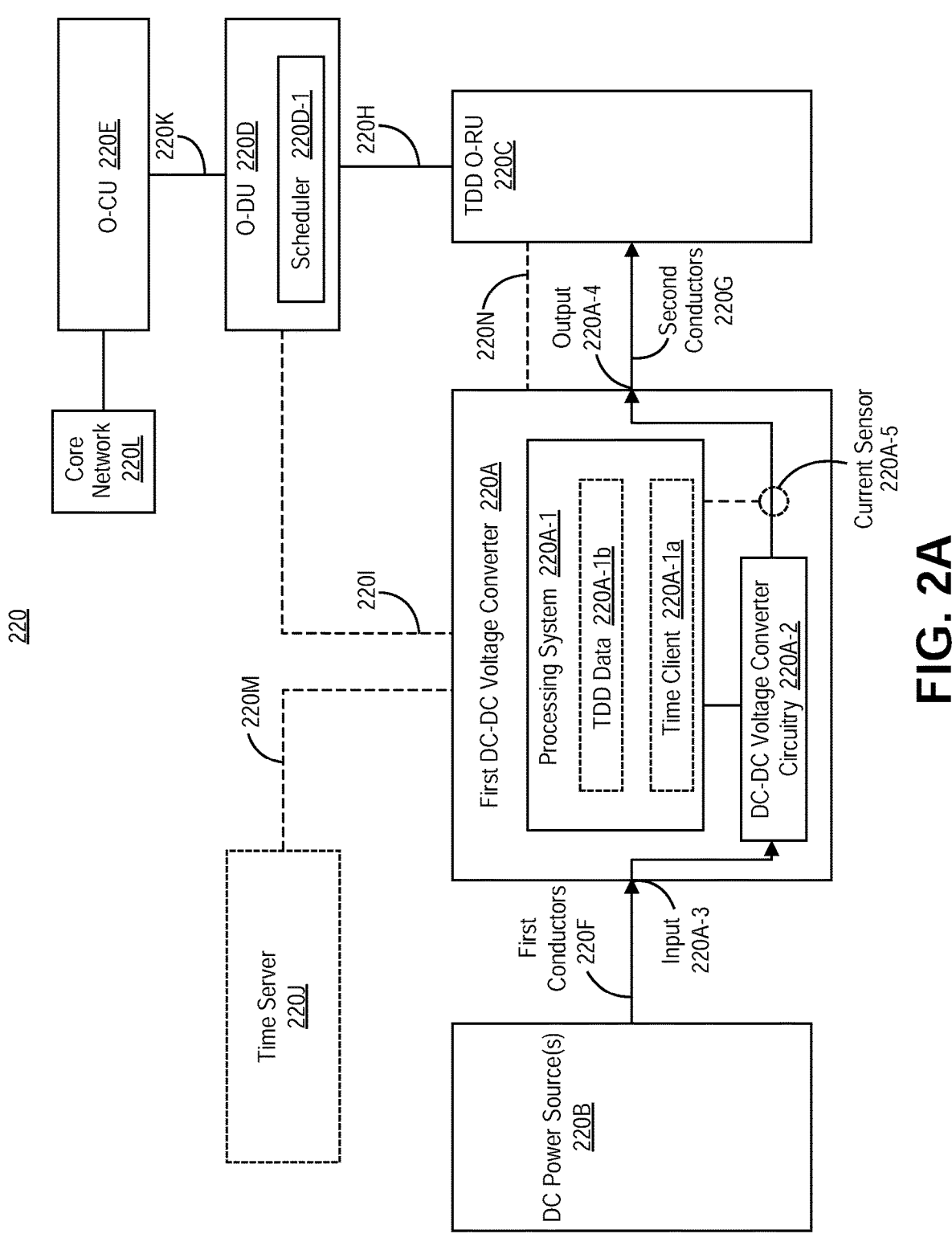
FIG. 2A illustrates a block diagram of one embodiment of a radio access network.

FIG. 2A illustrates a block diagram of one embodiment of a radio access network (RAN) 220. The RAN 220 comprises a TDD O-RU 220C, an O-DU 220D, an O-CU 220E, a first DC-DC voltage converter 220A, and at least one DC power source (DC power source(s)) 220B. Optionally, the DC power source(s) 220B comprise at least one of an alternating current (AC) to direct current (DC) (AC/DC) power supply, at least one battery, and/or any other type of DC power source, e.g., solar cells. The DC power source(s) 220B are electrically connected to a DC power input (input) 220A-3 of the first DC-DC voltage converter 220A through first electrical conductors (first conductors) 220F; the first electrical conductors 220F are configured to provide DC power from the DC power source(s) 220B to the first DC-DC voltage converter 220A. Optionally, the at least one DC power source 220B is configured to provide DC power, having a positive or negative voltage ranging between 40V-56V, to the DC power input 220A-3.

A DC power output (output) 220A-4 of the first DC-DC voltage converter 220A is electrically connected to, e.g., a DC power input of, the TDD O-RU 220C through second electrical conductors (second conductors) 220G. Each of the first electrical conductors 220F and the second electrical conductors 220G may comprise power cable(s), bus bar(s), wire(s) and/or other type of electrical conductors.

In a 5G radio access network designed according to the O-RAN specifications, the radio access network 220, includes an O-DU 220D configured to be coupled to at least one TDD O-RU 220C through a fronthaul gateway (FHG) communications link 220H compliant with the O-RAN specifications. The fronthaul gateway communications link 220H may be implemented with internet protocol and/or Ethernet networking technology. For pedagogical purposes, FIG. 2A illustrates a RAN 220 comprising a single TDD O-RU 220C communicatively coupled to an O-DU 220D. Further, an O-CU 220E is communicatively coupled to the O-DU 220D and a core network 220L. The O-CU 220E is communicatively coupled to the O-DU 220D through a first data link 220K For pedagogical purposes, the scheduler 220D-1 is illustrated as being part of the O-DU 220D. However, the scheduler 220D-1 may be located in a different component of the RAN 220, including for example the O-CU 220E. The scheduler 220D-1 and the time client 220A-1c may each be implemented in software executed on a processing system (or processing circuitry).

Optionally, a component of the RAN 220 (e.g., the O-DU 220D or the O-CU 220E) comprising the scheduler or communicatively coupled to another component of the RAN which comprises the scheduler is communicatively coupled to the first DC-DC voltage converter 220A. For pedagogical purposes, the O-DU 220D of FIG. 2A is illustrated as both being communicatively coupled to the first DC-DC voltage converter 220A through a second data link 220I and comprising the scheduler 220D-1. Optionally, one or both of the first data link 220K and the second data link 220I are an internet protocol network data link. Optionally, the scheduler 220D-1 is configured to provide, e.g., periodically, a TDD frame configuration of the TDD O-RU 220C to the first DC-DC voltage converter 220A and/or the first DC-DC voltage converter 220A is configured to request (and thus subsequently receive) from the scheduler 220D-1 the TDD frame configuration of the TDD O-RU 220C.

Downlink data to be sent to user equipment (wirelessly communicatively coupled to the TDD O-RU 220C) is sent from the core network 220L through the O-CU 220E and/or the O-DU 220D to the TDD O-RU 220C. Uplink data sent from such user equipment (wirelessly communicatively coupled to the TDD O-RU 220C) is sent from the TDD O-RU 220C through the O-DU 220D and/or the O-CU 220E to the core network 220L.

The O-DU 220D is configured to host radio link control (RLC), medium access control (MAC), and upper physical (Upper PHY) layers. Optionally, the O-DU is configured to host higher layer protocols, e.g., radio resource control, service data adaption protocol (SDAP), and packet data convergence protocol (PDCP); optionally, one or more of these services can be implemented the O-CU 220E. The O-DU 220D is further configured to provide frequency domain baseband data, e.g., having in-phase and quadrature phase (I and Q) components. Thus, the O-DU 220D has some functionality similar to 2G, 3G and/or 4G virtual baseband unit(s).

A data interface of the O-DU 220D (or O-DU interface) is configured to be coupled to either the O-CU 220E or a core network 220L. The O-CU is configured to be coupled between the O-RAN distributed unit and the core network 220L. Optionally, the O-DU 220D and/or the O-CU 220E are configured to be implemented in software executed on a server (or server circuitry) or a cloud computing system (or cloud computing system circuitry). Uplink and downlink data communicated through the O-DU interface comprises data in a user plane (U), a control plane (C), a synchronization plane(S), and/or a management plane (M). User plane data comprises voice and/or data transmitted to and from user equipment coupled to radio(s) of the RAN. Control plane data comprises messages used to control how a corresponding radio (receiving the control plane data) processes user plane In-phase and Quadrature-phase data stream in the uplink and downlink paths in real time. Synchronization plane data comprises data for synchronization and timing information between nodes (e.g., between a virtual baseband unit and a radio or between a modified fronthaul gateway and either a virtual baseband unit or a radio) of a RAN. Management plane data comprises data for operation, administration, and maintenance of radio(s), where such operation, administration, and maintenance are not required in real time. The control, synchronization, and/or management planes are bidirectional. Thus, a ping or a query sent in a one of the control, synchronization, and/or management plane in the downlink path may result in acknowledgement and/or responsive data the same plane in the uplink path.

Optionally, a TDD O-RU 220C may be mounted on, e.g., at or near a top of, a mounting structure, e.g., a tower and/or another form of a mounting structure, e.g., a pole. DC power is electrically coupled from the DC power source(s) 220B to the TDD O-RU 220C through the first DC-DC voltage converter 220A.

Optionally, the TDD O-RU 220C is communicatively coupled to the O-DU 220D through the fronthaul gateway communications link 220H; alternatively, the TDD O-RU 220C may be communicatively coupled to the O-DU 220D through another type of communications link, such as an internet protocol communications link. The O-DU 220D is configured to send downlink data to the TDD O-RU 220C. The TDD O-RU 220C is configured to send uplink data to the O-DU 220D.

Optionally, the first DC-DC voltage converter 220A is communicatively coupled to a component of the RAN 220 through a second data link 220I, e.g., an Ethernet network. For pedagogical purposes, the first DC-DC voltage converter 220A is illustrated as being communicatively coupled to the O-DU 220D by the second data link 220I. However, the first DC-DC voltage converter 220A may be optionally communicatively coupled through another communications link to another component (e.g., the O-CU 220E) of the RAN 220

The first DC-DC voltage converter 220A comprises a processing system (or processing circuitry) 220A-1 communicatively coupled to DC-DC voltage converter circuitry (or DC-DC voltage conversion circuitry) 220A-2. The DC-DC voltage converter circuitry 220A-2 of FIG. 2A may be implemented with a boost or a buck-boost converter. Optionally, the DC-DC voltage converter circuitry 220A-2 is configured to boost the DC voltage provided from the at least one DC power source 220B to a positive or negative voltage between 54-60V.

For pedagogical purposes, the processing system 220A-1 is illustrated as comprising an optional time client 220A-1*a* and optional TDD data 220A-1*b*. The processing system 220A-1 is configured to store and execute the time client 220A-1*a* and to store the TDD data 220A-1*b*.

Timing of the processing system 220A-1 must be synchronized with the RAN 220, e.g., the scheduler 220D-1. Typically, timing of components in the RAN 220, e.g., the scheduler 220D-1 and first DC-DC voltage converter 220A (e.g., the time client 220A-1*a* of the processing system 220A-1), are synchronized within one hundred nanoseconds or less, using synchronous Ethernet (SynchE), network time protocol (NTP), precision time protocol (PTP), or another time protocol. SynchE is compliant with International Telecommunications Union (ITU) Telecommunication standardization sector recommendations G.8261, G.8262, and G.8264. PTP is compliant with Institute of Electrical and Electronics Engineers (IEEE) standard 1588. Clocks used for time synchronization may be located at the baseband unit (e.g., virtual baseband unit), elsewhere in the RAN 220, elsewhere in a larger network including the RAN 220, and/or external to the RAN 220 and the larger network. Optionally, the first DC-DC voltage converter 220A may be communicatively coupled to a time server (or master clock) 220J, through a third data link 220M. The time server 220J is external to the RAN 220. Optionally, the time server 220J is a U.S. National Institutes of Standards and Technologies time server or another time server. The time server 220J in the RAN may be generally referred to as a time source. The processing system 220A-1 of the first DC-DC voltage converter 220A comprises the time client 220A1-*c* configured, upon performing time synchronization, to derive time accuracy similar to the time accuracy of the RAN 220 and its components so that the processing system 220A-1 can be synchronized in time with the TDD O-RU 220C. As a result, the DC-DC voltage converter can be configured to provide a larger DC voltage to the DC power input of the TDD O-RU 220C during downlink subframes and a smaller DC voltage to the DC power input of the TDD O-RU 220C outside of downlink subframes, e.g., during uplink subframes.

In one embodiment, the first DC-DC voltage converter 220A is configured to receive—a TDD frame configuration and the time reference of the TDD O-RU 220C—from the scheduler 220D-1 and/or the TDD O-RU 220C. Optionally, such information is conveyed through an optional second data link 220I, the fronthaul gateway communications link 220H, and/or an optional fourth data link 220N. In this embodiment, the first DC-DC voltage converter 220A, e.g., the time client 220A-1*a*, is configured to synchronize time with the RAN 220 utilizing at least one of a clock in the RAN 220 and the time server 220J.

The received TDD frame configuration is a unique sequence of downlink subframes and uplink subframes and the time duration of each of such subframe comprising the sequence. In this embodiment, the TDD data 220A-1*b* compromises the received TDD frame configuration and received time reference of the TDD O-RU 220C. Alternatively, the received TDD frame configuration may be an identifier, e.g., an alphanumeric designator, indicating a specific TDD frame configuration. In this alternative case, the TDD data 220A-1*b* compromises each TDD frame configuration (including the unique sequence of downlink subframes and uplink subframes and the time duration of each of such subframe comprising the sequence) and the identifier for each such TDD frame configuration. Optionally, each TDD frame configuration and the identifier for each such TDD frame configuration may be stored in a database, a lookup table, registers, etc. in the TDD data 220A-1*b*. The processing system 220A-1 would then be configured to determine the TDD frame configuration (including the unique sequence of downlink subframes and uplink subframes and the time duration of each of such subframes comprising the sequence) by matching the received identifier to a same identifier stored in the TDD data 220A-1*b*.

In an alternative embodiment, the first DC-DC voltage converter 220A does not receive information about the TDD frame configuration and the time reference from either the scheduler 220D-1 and the radio. Rather, in a calibration mode, the first DC-DC voltage converter 220A independently determines the TDD frame configuration and reference time of the TDD O-RU 220C. As described elsewhere herein, the time client 220A-1*a* synchronizes time with another component of the RAN 220 or an external time server (time server) 220J. Direct current (measured periodically over the one or more TDD frames at the output of the DC-DC voltage converter) and each measurement of direct current is measured is stored in the TDD data 220A-1*b*. Optionally, the direct current is measured by an optional current sensor 220A-5 coupled to the processing system 220A-1. The optional current sensor 220A-5 is a Hall effect sensor or another type of current sensor. Optionally, the TDD data 220A-1*b* also stores known TDD frame configurations. Optionally, the TDD data 220A-1*b* also stores a correlation or another algorithm used to determine TDD configuration type and a reference time. Using the stored known TDD frame configurations and the stored measured direct current, the processing system 220A-1 executes the algorithm to determine the TDD frame configuration and the reference time. Optionally, the algorithm is a correlation or pattern matching algorithm which correlates the direct current measured during the one or more TDD frames with each known TDD frame configuration. For each known TDD frame configuration, a downlink subframe corresponds to a large current level and an uplink subframe corresponds to a low current level, wherein the large current level is larger than the low current level. The correlation algorithm identifies a TDD frame configuration having a largest correlation value and also determines the time reference using the time of each direct current measurement. Optionally, the received or identified (a) TDD frame configuration or identifier and (b) the time reference may be stored in the TDD data 220A-1*b*. Optionally, the algorithm determines that a current level greater than or equal to a current threshold level is a downlink subframe, and a current level less than the current threshold level is an uplink subframe. The techniques described above regarding time synchronization and/or providing a higher voltage during a downlink subframe and a lower voltage outside of the downlink subframe, e.g., during an uplink subframe, may also be used by the first DC-DC voltage converter 220A of FIG. 2B which is subsequently described.

Regardless as to how the TDD frame configuration is determined, as discussed elsewhere herein, using the time reference, the processing system 220A-1 is further configured to determine the start and stop times of each subframe of received or identified TDD frame configuration. Optionally, guard time periods are utilized to ensure that the first DC-DC voltage converter 220A is configured to provide a larger DC voltage during each downlink subframe. FIG. 3 illustrates a first guard time period 335A and a second guard time period 335C respectively before and after a downlink subframe 335B. Optionally, each of the first and the second guard time period is 1 millisecond. Upon commencement of the first guard time period 335A prior to commencement of each downlink subframe 335B and upon completion of the second guard time period 335C following an end of each downlink subframe 335B, the processing system 220A-1 is configured to increase a DC voltage output by the DC-DC voltage converter circuitry 220A-2. During the remaining periods of time, e.g., during portions of the uplink sub-frames, the processing system 220A-1 is configured to provide a lower DC voltage, which is less than the higher DC voltage, at an output of the DC-DC voltage converter circuitry 220A-2. The first guard time period 335A may be equal to or different from the second guard time period 335C. Optionally, the second guard time period 335C may be or at least include a special subframe (SSF), illustrated in FIG. 1A. The special subframe provides time for each user equipment (UE) scheduled to transmit in the following uplink subframe to implement an offset transmission time, e.g., determined by the O-DU 220D, for the UE. Each UE's offset transmission time is used to align the UE's uplink transmission to compensate for the UE's physical distance from the TDD O-RU 220C. As a result, uplink transmissions, in a same resource block, by different UEs at different distances from the TDD O-RU 220C are received by the TDD O-RU 220C at the same time. Optionally, when the TDD O-RU 220C is operating during a special subframe, and thus neither transmitting nor receiving, then the first DC-DC voltage converter 220A is configured to provide the lower DC voltage (at the output of the DC-DC voltage converter circuitry 220A-2) provided when the TDD O-RU 220C is receiving. However, if the second guard time period 335C partially or completely overlaps the special subframe, then during such overlap, the first DC-DC voltage converter 220A is configured to provide the larger DC voltage (at the output of the DC-DC voltage converter circuitry 220A-2) provided when the TDD O-RU 220C is transmitting. The techniques described above regarding guard bands may be used by the first DC-DC voltage converter 220A of FIGS. 2A-2B.

Figure 2B:
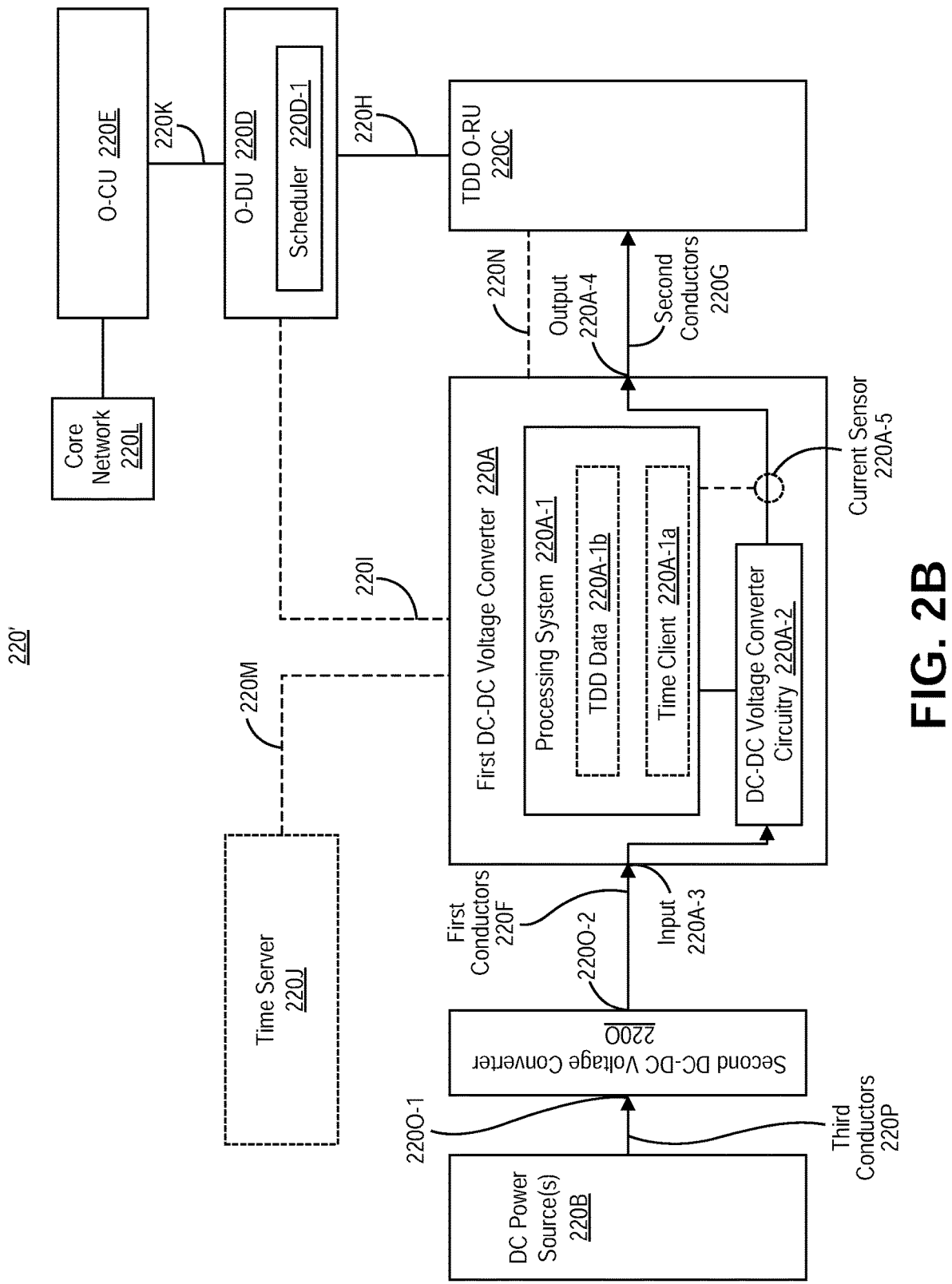
FIG. 2B illustrates a block diagram of another embodiment of a radio access network.
Figure 3:
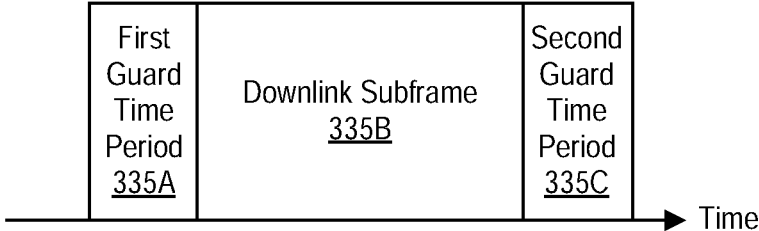
FIG. 3 illustrates a first guard time period and a second guard time period respectively before and after a downlink subframe.

FIG. 2B illustrates a block diagram of another embodiment of a radio access network (RAN) 220'. In this other embodiment, two DC-DC voltage converters are employed. The first DC-DC voltage converter 220A is located remote from the DC power source(s) 220B and proximate to the TDD O-RU 220C. The first DC-DC voltage converter 220A of FIG. 2B may be implemented with a buck or a buck-boost converter. A second DC-DC voltage converter 220O is located proximate to the DC power source(s) 220B and remote from the TDD O-RU 220C. The second DC-DC voltage converter 220O of FIG. 2B may be implemented with a boost or a buck-boost converter.

In this embodiment, the second DC-DC voltage converter 220O is configured to boost a voltage level provided to an input 220O-1 of the second DC-DC voltage converter 220O to a higher voltage provided at an output 220O-2 of the second DC-DC voltage converter 220O and which does not vary based upon TDD sub-frame. Third conductors 220P electrically couple the output of the DC power source(s) 220B to a DC power input of the second DC-DC voltage converter 220O. Optionally, the input 220O-1 of the second DC-DC voltage converter 200O is configured to receive a positive or negative voltage, between 40 VDC and 56 VDC, from the DC power source(s) 220B. Optionally, the output 220O-2 of the second DC-DC voltage converter 220O is configured to provide a positive or negative voltage, between 100 VDC and 320 VDC, which diminishes the current flowing through the first electrical conductors 220F and diminishes power loss in the first electrical conductors 220F. The first DC-DC voltage converter 220A is configured to reduce a DC voltage, e.g., substantially greater than a positive or negative 90 VDC, provided at the input 220A-3 of the to a lower voltage, e.g., positive or negative voltage between 40 VDC and 56 VDC, provided at the output 220A-4. The DC-DC voltage converter circuitry 220A-2 of FIG. 2B may be implemented with a buck or a buck-boost converter. The first DC-DC voltage converter 220A of FIG. 2B is configured to provide a higher voltage output during a downlink subframe, and a lower voltage output during an uplink subframe using one or more of the techniques described above for the first DC-DC voltage converter 220A of FIG. 2B. In FIG. 2B, third conductors 220P electrically couple the DC power source(s) 220B to the input 220O-1 of the second DC-DC voltage converter 220O, and the first conductors 220F electrically couple the output 220O-1 of the second DC-DC voltage converter 220O to the input 220A-3 of the first DC-DC voltage converter 220A.

Figure 4:
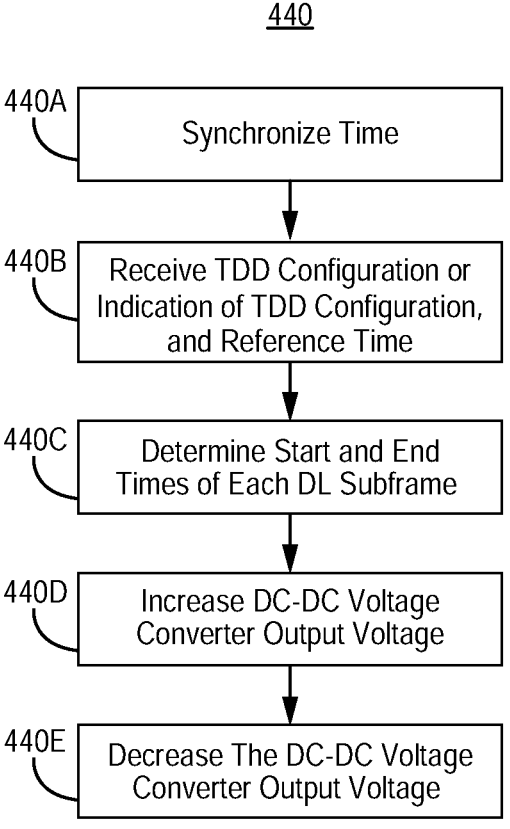
FIG. 4 illustrates a flow diagram of one embodiment of a method of providing DC power to a TDD radio.

FIG. 4 illustrates a flow diagram of one embodiment of a method 440 of providing DC power to a TDD radio. Method 440 may be implemented via the techniques described with respect to FIGS. 2A-3, but may be implemented with other techniques as well; for pedagogical purposes, implementation of method 440 is described with respect to FIGS. 2A-3. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 440A, time kept by a DC-DC voltage converter 220A, e.g., the time client, is synchronized with a component external to the DC-DC voltage converter 220A, e.g., a component of the RAN or a time server which is not part of the RAN. Thus, time kept by the DC-DC voltage converter 220A, e.g., by the processing system 220A-1, is synchronized with time of the RAN 220 or a network comprising the RAN. Optionally, the DC-DC voltage converter 220A, e.g., by the processing system 220A-1, receives time data utilizing conventional PTP, NTP, and/or eSynch techniques. Optionally, block 440A, may be performed more than once, e.g., periodically and/or aperiodically.

In block 440B, a TDD frame configuration or indication of TDD frame configuration, and a reference time is received by the first DC-DC voltage converter 220A from a component of a radio access network (RAN) external to the DC-DC voltage converter, e.g., from the scheduler and/or the TDD radio. In block 440C, using at least one of the TDD frame configuration and the reference time, a start time and an end time, of each downlink subframe in a TDD frame, is determined.

In block 440D, using the determined start time of each downlink subframe of the TDD frame, during each downlink (DL) subframe of the TDD frame, an output voltage provided by the first DC-DC voltage converter 220A is increased. Optionally, the output voltage is increased to a voltage larger than the nominal DC voltage and less than the maximum DC voltage. Optionally, the output voltage is increased prior to commencement of each DL subframe.

In block 440E, using the determined end time of each downlink subframe of the TDD frame, on or after completion of each downlink subframe of the TDD frame, the output voltage is provided by the first DC-DC voltage converter 220A is decreased. Optionally, the output voltage is decreased to the nominal DC voltage of the O-RU. Optionally, the output voltage is decreased after cessation of each DL subframe.

Figure 5:
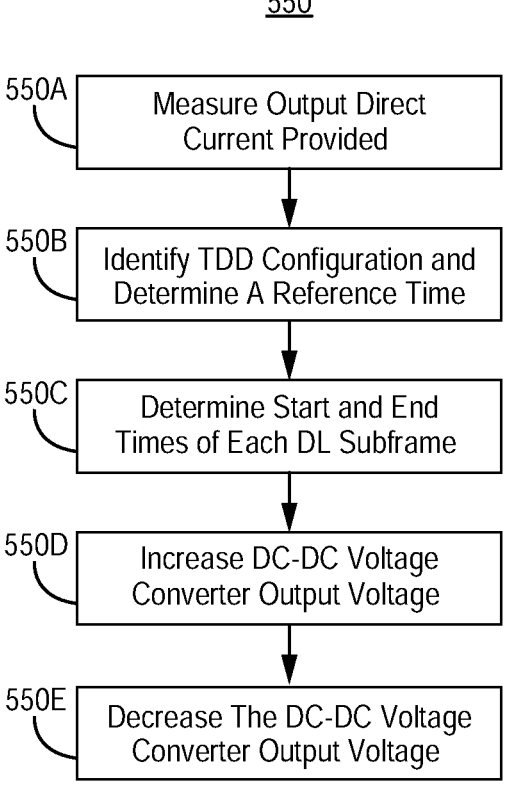
FIG. 5 illustrates a flow diagram of another embodiment of a method of providing DC power to a TDD radio.

FIG. 5 illustrates a flow diagram of another embodiment of a method 550 of providing DC power to a TDD radio. Method 550 may be implemented via the techniques described with respect to FIGS. 2A-3, but may be implemented with other techniques as well; for pedagogical purposes, implementation of method 550 is described with respect to FIGS. 2A-3. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 550A, an output direct current is measured, e.g., at an output of the DC-DC voltage converter 220A, for a time period of one or more, e.g., two or more, TDD frames. In block 550B, using the measured direct current, a TDD frame configuration of the TDD radio and a reference time is determined; optionally, this determination is made using an algorithm, e.g., a correlation algorithm (described herein) or a pattern matching algorithm. Optionally, the algorithm determines that a current level greater than or equal to a current threshold level is a downlink subframe, and a current level less than the current threshold level is an uplink subframe.

In block 550C, using at least one of the TDD frame configuration and the reference time, a start time and an end time, for each downlink subframe of the determined TDD frame configuration, is determined. For at least this embodiment, the time period of each downlink subframe and each uplink subframe for each TDD frame configuration are known, and are stored, e.g., in the TDD data 220A-1*a*. For at least this embodiment, the relative start time (e.g., relative with respect to a start time or end time of the TDD frame) and the relative end time (e.g., relative with respect to a start time or end time of the TDD frame) of each downlink subframe and each uplink subframe for each TDD frame configuration are known and stored, e.g., in the TDD data 220A-1*a*. The relative start time and the relative end time of each downlink subframe is determined using a known time period of downlink subframe(s) and/or uplink subframe(s).

In block 550D, using the determined start time of each downlink subframe of the TDD frame, during each downlink (DL) subframe of the TDD frame, an output voltage provided by the first DC-DC voltage converter 220A is increased. Optionally, the output voltage is increased to a voltage larger than the nominal DC voltage and less than the maximum DC voltage. Optionally, the output voltage is increased prior to commencement of each DL subframe.

In block 550E, using the determined end time of each downlink subframe of the TDD frame, on or after completion of each downlink subframe of the TDD frame, the output voltage is provided by the first DC-DC voltage converter 220A is decreased. Optionally, the output voltage is decreased to the nominal DC voltage of the O-RU. Optionally, the output voltage is decreased after cessation of each DL subframe.

The processor systems (or processor circuitry), cloud computing systems (or cloud computing circuitry), and servers (server circuitry) disclosed herein may comprise state machines, neural network, and/or other types of computing systems. Such systems may comprise processing circuitry coupled to memory circuitry. The processing circuitry may include one or more microprocessors, microcontrollers, digital signal processing (DSP) elements, application-specific integrated circuits (ASICs), and/or field programmable gate arrays (FPGAs). The processor system may include or function with software programs, firmware, or other computer readable instructions, e.g., stored in the memory circuitry, for carrying out various process tasks, calculations, and control functions, used in the methods described herein. These instructions are typically tangibly embodied on any storage media (or computer readable medium) used for storage of computer readable instructions or data structures.

The memory circuitry can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, Blu-Ray discs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory.

Methods of the invention can be implemented in computer readable instructions, such as program modules or applications, which may be stored in the computer readable medium and executed by the processing circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXAMPLE EMBODIMENTS

Example 1 includes a method for diminishing power dissipation in electrical conductors providing direct current (DC) electrical power to a time division duplexing (TDD) radio, the method comprising: synchronizing timing of a DC-DC voltage converter with a time source external to the DC-DC voltage converter; receiving, from a component of a radio access network (RAN) external to the DC-DC voltage converter, (a) a TDD frame configuration or an indication of the TDD frame configuration and (b) a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the start time of each downlink subframe in the TDD frame, during each downlink subframe, of the TDD frame, increasing a DC voltage output by the DC-DC voltage converter; and using the end time of each downlink subframe in the TDD frame, on or after cessation of each downlink subframe in the TDD frame, decreasing the DC voltage output by the DC-DC voltage converter.

Example 2 includes the method of Example 1, wherein increasing the DC voltage output by the DC-DC voltage converter comprises increasing the DC voltage, output by the DC-DC voltage converter, to a voltage level that is larger than a nominal DC voltage, of the TDD radio, at which the TDD radio is recommended to operate and less than a maximum DC voltage, of the TDD radio, which should not be exceeded.

Example 3 includes the method of any of Examples 1-2, wherein decreasing the DC voltage output by the DC-DC voltage converter comprises decreasing the DC voltage output by the DC-DC voltage converter to a nominal DC voltage, of the TDD radio, at which the TDD radio is recommended to operate.

Example 4 includes the method of any of Examples 1-3, wherein increasing the DC voltage output by the DC-DC voltage converter comprises increasing the DC voltage output by the DC-DC voltage converter upon a commencement of a first guard time period preceding each downlink subframe.

Example 5 includes the method of any of Examples 1-4, wherein decreasing the DC voltage output by the DC-DC voltage converter comprises decreasing the DC voltage output by the DC-DC voltage converter upon completion of a second guard time period succeeding each downlink subframe.

Example 6 includes a non-transitory computer readable medium storing a program causing at least one processor to execute a process for diminishing power dissipation in electrical conductors providing direct current (DC) electrical power to a time division duplexing (TDD) radio, the process comprising: synchronizing timing of a DC-DC voltage converter with a time source external to the DC-DC voltage converter; receiving, from a component of a radio access network (RAN) external to the DC-DC voltage converter, (a) a TDD frame configuration or an indication of the TDD frame configuration and (b) a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the start time of each downlink subframe in the TDD frame, during each downlink subframe, of the TDD frame, of the TDD radio, causing an increase of a DC voltage output by the DC-DC voltage converter; and using the end time of each downlink subframe in the TDD frame, on or after cessation of each downlink subframe in the TDD frame, causing a decrease of the DC voltage output by the DC-DC voltage converter.

Example 7 includes the non-transitory computer readable medium of Example 6, wherein causing the increase of the DC voltage output by the DC-DC voltage converter comprises causing an increase of the DC voltage, output by the DC-DC voltage converter, to a voltage level that is larger than a nominal DC voltage, of the TDD radio, at which the TDD radio is recommended to operate and less than a maximum DC voltage, of the TDD radio, which should not be exceeded.

Example 8 includes the non-transitory computer readable medium of any of Examples 6-7, wherein causing the decrease of the DC voltage output by the DC-DC voltage converter comprises causing a decrease of the DC voltage output by the DC-DC voltage converter to a nominal DC voltage, of the TDD radio, at which the TDD radio is recommended to operate.

Example 9 includes the non-transitory computer readable medium of any of Examples 6-8, wherein causing the increase of the DC voltage output by the DC-DC voltage converter comprises causing an increase of the DC voltage output by the DC-DC voltage converter upon a commencement of a first guard time period preceding each downlink subframe.

Example 10 includes the non-transitory computer readable medium of any of Examples 6-9, wherein causing the decrease of the DC voltage output by the DC-DC voltage converter comprises causing a decrease of the DC voltage output by the DC-DC voltage converter upon completion of a second guard time period succeeding each downlink subframe.

Example 11 includes an apparatus for diminishing power dissipation in electrical conductors providing direct current (DC) electrical power to a time division duplexing (TDD) radio, the apparatus comprising: DC-DC voltage converter circuitry configured to be electrically coupled, through the electrical conductors, to a DC power input of the TDD radio; and processing circuitry communicatively coupled to the DC-DC voltage converter circuitry, configured to be communicatively coupled to a time source external to the apparatus, and configured to: synchronize timing of a DC-DC voltage converter with the time source external to the DC-DC voltage converter; receive, from a component of a radio access network (RAN) external to the DC-DC voltage converter, (a) a TDD frame configuration or an indication of the TDD frame configuration and (b) a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using the start time of each downlink subframe in the TDD frame, during each downlink subframe, of the TDD frame, of the TDD radio, cause an increase of a DC voltage output by the DC-DC voltage converter circuitry; and using the end time of each downlink subframe in the TDD frame, on or after cessation of each downlink subframe in the TDD frame, cause a decrease of the DC voltage output by the DC-DC voltage converter circuitry.

Example 12 includes the apparatus of Example 11, wherein processing circuitry receives the indication which is an identifier of the TDD frame configuration; wherein the processing circuitry is further configured to: store each type of TDD frame configuration including a unique sequence of uplink and downlink subframes therein and a time duration of each subframe in the unique sequence; and determine the TDD frame configuration based upon the identifier.

Example 13 includes the apparatus of any of Examples 11-12, wherein the component of the RAN external to the DC-DC voltage converter comprises the TDD radio or a scheduler.

Example 14 includes the apparatus of any of Examples 11-13, wherein the DC-DC voltage converter circuitry comprises a boost converter or a buck-boost converter.

Example 15 includes the apparatus of any of Examples 11-14, wherein the DC-DC voltage converter circuitry is configured to receive DC electrical power from a DC-DC boost voltage converter; wherein the DC-DC voltage converter circuitry comprises a buck converter or a buck-boost converter.

Example 16 includes the apparatus of any of Examples 11-15, wherein cause the increase of the DC voltage output by the DC-DC voltage converter circuitry comprises cause an increase of the DC voltage, output by the DC-DC voltage converter circuitry, to a voltage level that is larger than a nominal DC voltage, of the TDD radio, at which the TDD radio is recommended to operate and less than a maximum DC voltage, of the TDD radio, which should not be exceeded.

Example 17 includes the apparatus of any of Examples 11-16, wherein cause the decrease of the DC voltage output by the DC-DC voltage converter circuitry comprises cause a decrease of the DC voltage output by the DC-DC voltage converter circuitry to a nominal DC voltage, of the TDD radio, at which the TDD radio is recommended to operate.

Example 18 includes the apparatus of any of Examples 11-17, wherein cause the increase of the DC voltage output by the DC-DC voltage converter circuitry comprises cause an increase of the DC voltage output by the DC-DC voltage converter circuitry upon a commencement of a first guard time period preceding each downlink subframe.

Example 19 includes the apparatus of any of Examples 11-18, wherein cause the decrease of the DC voltage output by the DC-DC voltage converter circuitry comprises cause a decrease of the DC voltage output by the DC-DC voltage converter circuitry upon completion of a second guard time period succeeding each downlink subframe.

Example 20 includes a method for diminishing power dissipation in electrical conductors providing direct current (DC) electrical power to a time division duplexing (TDD) radio, the method comprising: identifying a TDD frame configuration of the TDD radio and determining a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using at least one of the TDD frame configuration and the reference time, determining a start time and an end time of each downlink subframe in the TDD frame; using the start time of each downlink subframe in the TDD frame, during each downlink subframe, of the TDD frame, of the TDD radio, increasing a DC voltage output by the DC-DC voltage converter; and using the end time of each downlink subframe in the TDD frame, on or after cessation of each downlink subframe in the TDD frame, decreasing the DC voltage output by the DC-DC voltage converter.

Example 21 includes the method of Example 20, further comprising measuring direct current at an output of a DC-DC voltage converter; wherein identifying the TDD frame configuration of the TDD radio and determining the reference time using the direct current, comprises using the direct current, identifying the TDD frame configuration of the TDD radio and determining the reference time.

Example 22 includes the method of any of Examples 20-21, wherein identifying the TDD frame configuration of the TDD radio comprises applying at least one of (a) pattern matching and (b) correlation to the direct current and stored each type of TDD frame configuration.

Example 23 includes the method of any of Examples 20-22, wherein increasing the DC voltage output by the DC-DC voltage converter comprises increasing the DC voltage, output by the DC-DC voltage converter, to a voltage level that is larger than a nominal DC voltage, of the TDD radio, at which the TDD radio is recommended to operate and less than a maximum DC voltage, of the TDD radio, which should not be exceeded.

Example 24 includes the method of any of Examples 20-23, wherein decreasing the DC voltage output by the DC-DC voltage converter comprises decreasing the DC voltage output by the DC-DC voltage converter to a nominal DC voltage, of the TDD radio, at which the TDD radio is recommended to operate.

Example 25 includes the method of any of Examples 20-24, wherein increasing the DC voltage output by the DC-DC voltage converter comprises increasing the DC voltage output by the DC-DC voltage converter upon a commencement of a first guard time period preceding each downlink subframe.

Example 26 includes the method of any of Examples 20-25, wherein decreasing the DC voltage output by the DC-DC voltage converter comprises decreasing the DC voltage output by the DC-DC voltage converter upon completion of a second guard time period succeeding each downlink subframe.

Example 27 includes a non-transitory computer readable medium storing a program causing at least one processor to execute a process for diminishing power dissipation in electrical conductors providing direct current (DC) electrical power to a time division duplexing (TDD) radio, the process comprising: identifying a TDD frame configuration of the TDD radio and determining a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using at least one of the TDD frame configuration and the reference time, determining a start time and an end time of each downlink subframe in a TDD frame; using the start time of each downlink subframe in the TDD frame, during each downlink subframe, of the TDD frame, of the TDD radio, causing an increase of a DC voltage output by the DC-DC voltage converter; and using the end time of each downlink subframe in the TDD frame, on or after cessation of each downlink subframe in the TDD frame, causing a decrease of the DC voltage output by the DC-DC voltage converter.

Example 28 includes the non-transitory computer readable medium of Example 27, wherein the process further comprises receiving a direct current measured at an output of a DC-DC voltage converter; wherein identifying the TDD frame configuration of the TDD radio and determining the reference time using the direct current, comprises using the direct current, identifying the TDD frame configuration of the TDD radio and determining the reference time.

Example 29 includes the non-transitory computer readable medium of any of Examples 27-28, wherein identifying the TDD frame configuration of the TDD radio comprises applying at least one of (a) pattern matching and (b) correlation to the direct current and stored each type of TDD frame configuration.

Example 30 includes the non-transitory computer readable medium of any of Examples 27-29, wherein causing an increase of the DC voltage output by the DC-DC voltage converter comprises causing an increase of the DC voltage, output by the DC-DC voltage converter, to a voltage level that is larger than a nominal DC voltage, of the TDD radio, at which the TDD radio is recommended to operate and less than a maximum DC voltage, of the TDD radio, which should not be exceeded.

Example 31 includes the non-transitory computer readable medium of any of Examples 27-30, wherein causing the decrease of the DC voltage output by the DC-DC voltage converter comprises causing a decrease of the DC voltage output by the DC-DC voltage converter to a nominal DC voltage, of the TDD radio, at which the TDD radio is recommended to operate.

Example 32 includes the non-transitory computer readable medium of any of Examples 27-31, wherein causing the increase of the DC voltage output by the DC-DC voltage converter comprises causing the increase of the DC voltage output by the DC-DC voltage converter upon a commencement of a first guard time period preceding each downlink subframe.

Example 33 includes the non-transitory computer readable medium of any of Examples 27-32, wherein causing the decrease of the DC voltage output by the DC-DC voltage converter comprises causing the decrease of the DC voltage output by the DC-DC voltage converter upon completion of a second guard time period succeeding each downlink subframe.

Example 34 includes an apparatus for diminishing power dissipation in electrical conductors providing direct current (DC) electrical power to a time division duplexing (TDD) radio, the apparatus comprising: DC-DC voltage converter circuitry comprising an output and configured to be electrically coupled, through the electrical conductors, to a DC power input of the TDD radio; current measurement circuitry coupled to the output and configured to measure direct current drawn from the output of the DC-DC voltage converter circuitry; and processing circuitry communicatively coupled to the DC-DC voltage converter circuitry, configured to be communicatively coupled to a time source external to the apparatus, and configured to: identify a TDD frame configuration of the TDD radio and determining a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using at least one of the TDD frame configuration and the reference time, determine a start time and an end time of each downlink subframe in a TDD frame; using the start time of each downlink subframe in the TDD frame, during each downlink subframe, of the TDD frame, of the TDD radio, cause an increase of a DC voltage output by the DC-DC voltage converter circuitry; and using the end time of each downlink subframe in the TDD frame, on or after cessation of each downlink subframe in the TDD frame, cause a decrease of the DC voltage output by the DC-DC voltage converter circuitry.

Example 35 includes the apparatus of Example 34, wherein the processing circuitry is further configured to receive a direct current measured at the output of a DC-DC voltage converter; wherein identify the TDD frame configuration of the TDD radio and determine the reference time using the direct current, comprises using the direct current, identify the TDD frame configuration of the TDD radio and determine the reference time.

Example 36 includes the apparatus of any of Examples 34-35, wherein identifying the TDD frame configuration of the TDD radio comprises applying at least one of (a) pattern matching and (b) correlation to the direct current and stored each type of TDD frame configuration.

Example 37 includes the apparatus of any of Examples 34-36, wherein the current measurement circuitry comprises a Hall effect sensor.

Example 38 includes the apparatus of any of Examples 34-37, wherein the DC-DC voltage converter circuitry comprises a boost converter or a buck-boost converter.

Example 39 includes the apparatus of any of Examples 34-38, wherein the DC-DC voltage converter circuitry is configured to receive DC electrical power from a DC-DC boost voltage converter; wherein the DC-DC voltage converter circuitry comprises a buck converter or a buck-boost converter.

Example 40 includes the apparatus of any of Examples 34-39, wherein identify the TDD frame configuration of the TDD radio comprises apply at least one of (a) pattern matching and (b) correlation to the direct current and stored each type of TDD frame configuration.

Example 41 includes the apparatus of any of Examples 34-40, wherein cause an increase of the DC voltage output by the DC-DC voltage converter circuitry comprises cause an increase of the DC voltage, output by the DC-DC voltage converter circuitry, to a voltage level that is larger than a nominal DC voltage, of the TDD radio, at which the TDD radio is recommended to operate and less than a maximum DC voltage, of the TDD radio, which should not be exceeded.

Example 42 includes the apparatus of any of Examples 34-41, wherein cause the decrease of the DC voltage output by the DC-DC voltage converter circuitry comprises cause a decrease of the DC voltage output by the DC-DC voltage converter circuitry to a nominal DC voltage, of the TDD radio, at which the TDD radio is recommended to operate.

Example 43 includes the apparatus of any of Examples 34-42, wherein cause the increase of the DC voltage output by the DC-DC voltage converter circuitry comprises cause the increase of the DC voltage output by the DC-DC voltage converter circuitry upon a commencement of a first guard time period preceding each downlink subframe.

Example 44 includes the apparatus of any of Examples 34-43, wherein cause the decrease of the DC voltage output by the DC-DC voltage converter circuitry comprises cause the decrease of the DC voltage output by the DC-DC voltage converter circuitry upon completion of a second guard time period succeeding each downlink subframe.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for diminishing power dissipation in electrical conductors providing direct current (DC) electrical power to a time division duplexing (TDD) radio, the method comprising:

synchronizing timing of a DC-DC voltage converter with a time source external to the DC-DC voltage converter;

receiving, from a component of a radio access network (RAN) external to the DC-DC voltage converter, (a) a TDD frame configuration or an indication of the TDD frame configuration and (b) a reference time;

wherein the reference time is a time when a reference TDD frame commences in a past, a present, or a future, or another time from which such time can be derived;

using at least one of the TDD frame configuration and the reference time, determining a start time and an end time of each downlink subframe in a TDD frame;

using the start time of each downlink subframe in the TDD frame, during each downlink subframe, of the TDD frame, increasing a DC voltage output by the DC-DC voltage converter; and using the end time of each downlink subframe in the TDD frame, on or after cessation of each downlink subframe in the TDD frame, decreasing the DC voltage output by the DC-DC voltage converter.

2. The method of claim 1, wherein increasing the DC voltage output by the DC-DC voltage converter comprises increasing the DC voltage, output by the DC-DC voltage converter, to a voltage level that is larger than a nominal DC voltage, of the TDD radio, at which the TDD radio is recommended to operate and less than a maximum DC voltage, of the TDD radio, which should not be exceeded.

3. The method of claim 1, wherein decreasing the DC voltage output by the DC-DC voltage converter comprises decreasing the DC voltage output by the DC-DC voltage converter to a nominal DC voltage, of the TDD radio, at which the TDD radio is recommended to operate.

4. The method of claim 1, wherein increasing the DC voltage output by the DC-DC voltage converter comprises increasing the DC voltage output by the DC-DC voltage converter upon a commencement of a first guard time period preceding each downlink subframe.

5. The method of claim 1, wherein decreasing the DC voltage output by the DC-DC voltage converter comprises decreasing the DC voltage output by the DC-DC voltage converter upon completion of a second guard time period succeeding each downlink subframe.

6. A non-transitory computer readable medium storing a program causing at least one processor to execute a process for diminishing power dissipation in electrical conductors providing direct current (DC) electrical power to a time division duplexing (TDD) radio, the process comprising:

synchronizing timing of a DC-DC voltage converter with a time source external to the DC-DC voltage converter;

receiving, from a component of a radio access network (RAN) external to the DC-DC voltage converter, (a) a TDD frame configuration or an indication of the TDD frame configuration and (b) a reference time;

wherein the reference time is a time when a reference TDD frame commences in a past, a present, or a future, or another time from which such time can be derived;

using at least one of the TDD frame configuration and the reference time, determining a start time and an end time of each downlink subframe in a TDD frame;

using the start time of each downlink subframe in the TDD frame, during each downlink subframe, of the TDD frame, of the TDD radio, causing an increase of a DC voltage output by the DC-DC voltage converter; and using the end time of each downlink subframe in the TDD frame, on or after cessation of each downlink subframe in the TDD frame, causing a decrease of the DC voltage output by the DC-DC voltage converter.

7. The non-transitory computer readable medium of claim 6, wherein causing the increase of the DC voltage output by the DC-DC voltage converter comprises causing an increase of the DC voltage, output by the DC-DC voltage converter, to a voltage level that is larger than a nominal DC voltage, of the TDD radio, at which the TDD radio is recommended to operate and less than a maximum DC voltage, of the TDD radio, which should not be exceeded.

8. The non-transitory computer readable medium of claim 6, wherein causing the decrease of the DC voltage output by the DC-DC voltage converter comprises causing a decrease of the DC voltage output by the DC-DC voltage converter to a nominal DC voltage, of the TDD radio, at which the TDD radio is recommended to operate.

9. The non-transitory computer readable medium of claim 6, wherein causing the increase of the DC voltage output by the DC-DC voltage converter comprises causing an increase of the DC voltage output by the DC-DC voltage converter upon a commencement of a first guard time period preceding each downlink subframe.

10. The non-transitory computer readable medium of claim 6, wherein causing the decrease of the DC voltage output by the DC-DC voltage converter comprises causing a decrease of the DC voltage output by the DC-DC voltage converter upon completion of a second guard time period succeeding each downlink subframe.

11. An apparatus for diminishing power dissipation in electrical conductors providing direct current (DC) electrical power to a time division duplexing (TDD) radio, the apparatus comprising:

DC-DC voltage converter circuitry configured to be electrically coupled, through the electrical conductors, to a DC power input of the TDD radio; and processing circuitry communicatively coupled to the DC-DC voltage converter circuitry, configured to be communicatively coupled to a time source external to the apparatus, and configured to:

synchronize timing of a DC-DC voltage converter with the time source external to the DC-DC voltage converter;

receive, from a component of a radio access network (RAN) external to the DC-DC voltage converter, (a) a TDD frame configuration or an indication of the TDD frame configuration and (b) a reference time;

wherein the reference time is a time when a reference TDD frame commences in a past, a present, or a future, or another time from which such time can be derived;

using at least one of the TDD frame configuration and the reference time, determine a start time and an end time of each downlink subframe in a TDD frame;

using the start time of each downlink subframe in the TDD frame, during each downlink subframe, of the TDD frame, of the TDD radio, cause an increase of a DC voltage output by the DC-DC voltage converter circuitry; and using the end time of each downlink subframe in the TDD frame, on or after cessation of each downlink subframe in the TDD frame, cause a decrease of the DC voltage output by the DC-DC voltage converter circuitry.

12. The apparatus of claim 11, wherein processing circuitry receives the indication which is an identifier of the TDD frame configuration;

wherein the processing circuitry is further configured to:

store each type of TDD frame configuration including a unique sequence of uplink and downlink subframes therein and a time duration of each subframe in the unique sequence; and determine the TDD frame configuration based upon the identifier.

13. The apparatus of claim 11, wherein the component of the RAN external to the DC-DC voltage converter comprises the TDD radio or a scheduler.

14. The apparatus of claim 11, wherein the DC-DC voltage converter circuitry comprises a boost converter or a buck-boost converter.

15. The apparatus of claim 11, wherein the DC-DC voltage converter circuitry is configured to receive DC electrical power from a DC-DC boost voltage converter;

wherein the DC-DC voltage converter circuitry comprises a buck converter or a buck-boost converter.

16. The apparatus of claim 11, wherein cause the increase of the DC voltage output by the DC-DC voltage converter circuitry comprises cause an increase of the DC voltage, output by the DC-DC voltage converter circuitry, to a voltage level that is larger than a nominal DC voltage, of the TDD radio, at which the TDD radio is recommended to operate and less than a maximum DC voltage, of the TDD radio, which should not be exceeded.

17. The apparatus of claim 11, wherein cause the decrease of the DC voltage output by the DC-DC voltage converter circuitry comprises cause a decrease of the DC voltage output by the DC-DC voltage converter circuitry to a nominal DC voltage, of the TDD radio, at which the TDD radio is recommended to operate.

18. The apparatus of claim 11, wherein cause the increase of the DC voltage output by the DC-DC voltage converter circuitry comprises cause an increase of the DC voltage output by the DC-DC voltage converter circuitry upon a commencement of a first guard time period preceding each downlink subframe.

19. The apparatus of claim 11, wherein cause the decrease of the DC voltage output by the DC-DC voltage converter circuitry comprises cause a decrease of the DC voltage output by the DC-DC voltage converter circuitry upon completion of a second guard time period succeeding each downlink subframe.

\* \* \* \* \*